Sept. 10, 1940.　　　K. FREUDENHAMMER　　　2,214,610

CONTROL SCHEME FOR FREQUENCY CHANGERS

Filed Aug. 27, 1938

WITNESSES:
Leon M. Garman
R. V. Bailey

INVENTOR
Klaus Freudenhammer.
BY
S. A. Strickland
ATTORNEY

Patented Sept. 10, 1940

2,214,610

UNITED STATES PATENT OFFICE 2,214,610

CONTROL SCHEME FOR FREQUENCY CHANGERS

Klaus Freudenhammer, Berlin-Charlottenburg, Germany, assignor to Westinghouse Electric & Manufacturing Company, East Pittsburgh, Pa., a corporation of Pennsylvania Application August 27, 1938, Serial No. 227,090
In Germany January 26, 1938

5 Claims. (Cl. 172—281)

The invention relates to converters and especially converters increasing the frequency of alternating current.

An object of the invention is to avoid the use of rotating mechanical contact apparatus and large direct current potential sources that are necessary with prior art converters.

Another object is to provide a converter that may be accurately controlled.

Other objects and advantages will be apparent from the following description and drawing in which.

The invention concerns a control device for direct inverters which operate with control gas or vapor discharge paths and convert an alternating current of given frequency into one preferably of higher frequency. The ignition impulses that are effective on the control electrode in the gas or vapor discharge paths, are of a frequency of the alternating current to be produced and depend upon a potential which is equal to the alternating current frequency to be converted. This control of the ignition timepoint is attained by impressing on the control electrode of the gas or vapor discharge path, a potential which is composed of three components of predetermined relative dimensions. The three components are an impulse potential of the frequency of the current to be converted, an alternating current of the frequency to be produced and a negative direct current potential serving as blocking potential. The relative dimensions of the last two potentials is so selected that the alternating potential of the frequency of the current to be produced itself does not produce ignition. On the contrary, the latter is raised to its ignition possibility through its component waves by the impulse potential. As potential which determines the effectiveness of the ignition impulses, a phase variable potential of rectangular form is utilized. The phase position establishes with certainty the degree to which the converter passes current. The rectangular form conveys to the control device a high degree of operating certainty and regulating accuracy.

In accordance with the invention, the rectangular potential, which determines the effectiveness of the ignition impulses, is a rectified alternating potential. In addition, the alternating potential is of higher frequency than the alternating potential to be converted. Preferably, it is equivalent to the potential supplying the ignition impulses. Preferably, further auxiliary devices are provided which serve for smoothing out the rectified alternating potential. To gain the potential of rectangular form, auxiliary discharge paths with gas or vapor filling, which, on the grid side, are controlled by a phase variable alternating potential of the frequency of the alternating current to be converted, are utilized.

Figure 1:
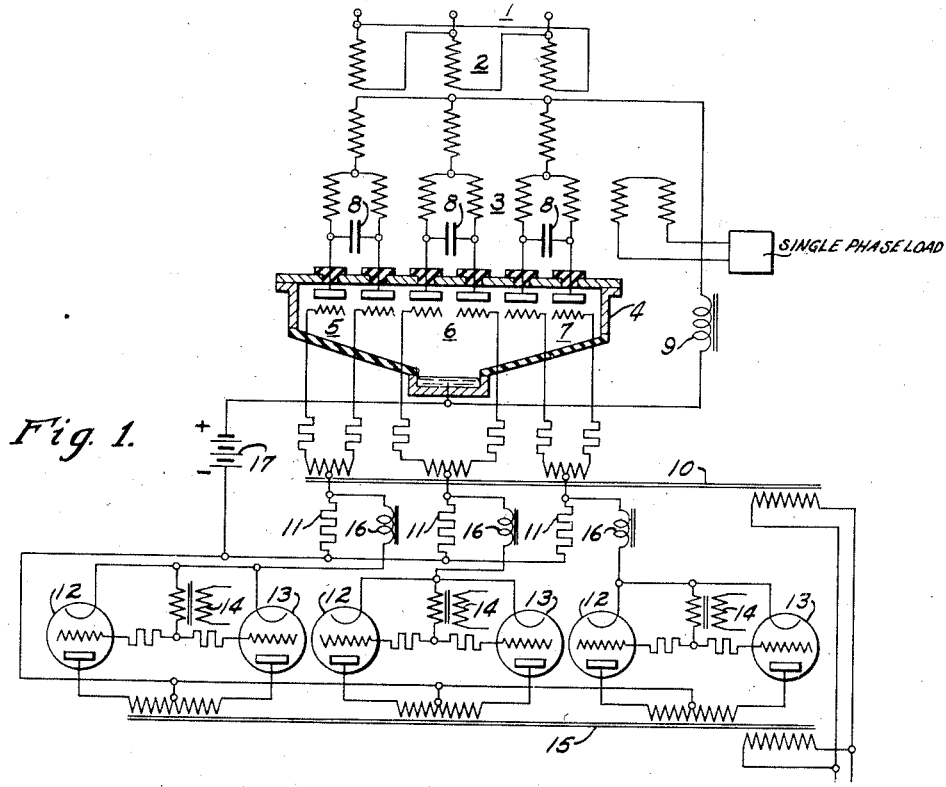
Figure 1 is a diagrammatic circuit illustrating a preferred embodiment of the invention.

In the drawing, in Fig. 1, a preferred embodiment of the invention is illustrated. Here the control of a converter operating with gas or vapor discharge paths is involved for converting a three-phase alternating current, such as the Continental 50 cycles or the American 60 cycles, into a single phase alternating current of higher frequency. The network 1 of the alternating current to be converted feeds the primary winding of the transformer 2; the star-connected secondary windings of the latter are connected through the mid-tapped primary windings of a second transformer 3 to the anodes of the discharge vessel 4. From the secondary winding of the transformer 3, the converted high frequency consumption current is derived. Each two discharge paths combined together into parallel inverters 5, 6, 7 of the vessel 4 are, on the anode side, bridged by extinction condensers 8. The single cathode of the discharge vessel 4 is connected through a stabilizing choke 9 with the secondary starpoint of the transformer 2. Each two control electrodes, associated with a parallel inverter, are connected with the end points of each one of the secondary windings of the grid transformer 10. Each middle tap of this secondary winding is connected to each of the impedances 11 on which the control potential of rectangular form is impressed.

For the latter purpose, the one end-point of each impedance 11 is in conductive connection each through a choke 16 with the connection-point on the cathode side of each of the pairs of grid controlled gas or vapor discharge vessels 12, 13. Each of these connection-points on the cathode side is connected through a secondary winding of a transformer 14 and through a series impedance to the grid 7, to associated discharge vessel 12, 13. The transformers 14 are excited by a potential obtained from the portional potentials of a phase variable, 3-phase potential in the frequency of the alternating current to be converted, such as 50 or 60 cycles. The inverters 5, 6, 7 associated on the alternating current side with the phase potentials and transformers 14 correspond to each other. The anodes of each of the auxiliary discharge path pairs 12, 13 are connected with each other, each through a secondary winding of the transformer 15. The mid-taps of these secondary windings are connected to each other and in common with the other terminal points of the impedances 11. The primary windings of the two transformers 10 and 15 are supplied from a potential which is equal in frequency to the alternating current to be produced. The direct current potential source 17 impresses on the grids of the main discharge vessel 4, a negative bias potential.

The operation of the preferred embodiment is briefly as follows:

If the alternating potential of the frequency of the alternating current to be converted impressed on the grid of the auxiliary discharge path pairs 12, 13 exceeds the ignition potential value, the individual discharge paths 12, 13 are rendered conductive in alternating sequence and indeed each one in rhythm with the potential of the frequency of the alternating current to be produced supplied to it on the anode side. During this time, the discharge path 12 is, for example, conducting during the positive half wave and the discharge path 13 during the negative half wave of the potential exciting 15. At the common output side of the current conducting discharge path pairs 13, 13, current impulses of a single polarity and of double the frequency, are manifested, accordingly measured by the potential impressed on the primary side of 15. As a consequence of the smoothing effect of the choke 16 on the output side, a positive rectangular potential is formed on the associated impedance 11, the initiation time-point of which is determined by the phase position of the potential effective on the grid-transformer 14. This positive rectangular potential is superimposed on each grid of the inverter discharge path on a negative bias potential supplied by 17 and an alternating potential supplied through 10 which is of the frequency of the alternating current to be produced. The consequence is a raising of the high frequency portion waves throughout to the ignition potential value. Those inverter discharge paths then ignite and extinguish in alternating sequence, the associated auxiliary discharge path pairs 12, 13 of which are current conducting. This play continues until another discharge path pair 12, 13 takes over the current conduction. With this, the inverter associated with this pair releases the directly operating inverter. The position of the first ignition time-point within the time-interval of positive anode phase potential of an inverter determines the extent to which the converter passes current. It is manifestly established by the phase position of the alternating potential exciting the transformer 14. The uninterrupted transition from one to the other of the inverters is provided for by the stabilizing effect of the choke coil 16.

In an advantageous and simplified further development of the invention, only those of all of the switching means, which take over the rectification of well defined alternating potential half waves, are provided with control devices, which serve for producing the rectangular potential by means of rectification of a higher frequency alternating potential. The rectification of the other half waves takes place, in accordance with the invention, with the aid of uncontrolled rectifier paths. For this purpose, dry rectifiers may preferably be utilized.

The invention thereby attains a considerable decrease in the consumption and in the other control and switching members because of the saving of costly and sensitive discharge vessels. With this is included a further increase of the operating safety of the whole plant.

Figure 2:
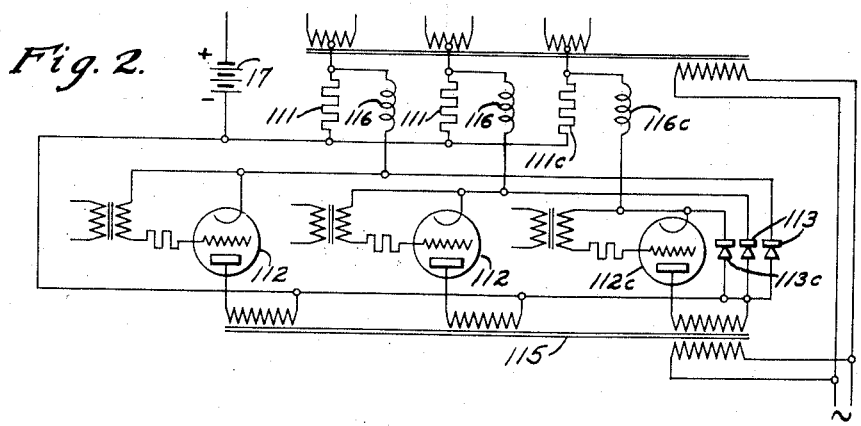
Fig. 2 is a diagrammatic circuit modification of a portion of Fig. 1.

Fig. 2 shows a preferred embodiment of this advantageous extended structure of the control device according to the invention. Here only the control apparatus is reproduced, i. e., the main discharge vessels are omitted. The numbering of the switching parts which relate to Fig. 1 are selected correspondingly in the hundreds. In place of the controlled discharge vessels 13 of Fig. 1, dry rectifiers 113 are here involved.

If, for example, the auxiliary discharge path 112c is rendered conductive as a result of the fact that its grid potential attains the ignition value, the current flow in the circuit 112c, 116c, and 111c produces a positive potential drop at the resistance 111c. As a consequence of the reservoir action of the choke 116c, this current flow maintains the corresponding potential built up thereby at 111c throughout the half period of the potential feeding 115. This manner of operation is independent of the position of the ignition time-point of the auxiliary discharge path 112c. After the passage of this time-interval, the choke coil 116c which has once been energized by an impulse forces a second current impulse through the dry rectifier 113c in the circuit 113c, 116c, 111c. To this corresponds the formation of a second potential drop at 111c which, without pause, follows the first one. It also maintains throughout a half period of the potential feeding 115. Accordingly, on 111c, positive potential impulses are formed which, in time, follow each other without a gap, and in frequency, are twice as great as the potential supplied to 115. The effect of choke 116c smooths them out to a rectangular potential, the frequency and phase position of which is determined by the grid potential of 112c.

For the control of the auxiliary discharge paths, single phase transformers may be used as well as three-phase transformers.

The preferred embodiments require no direct current potential source for the control device. This is of particular advantage where a suitable direct current potential is not, without additional complications, available.

The three-phase arrangements for the exemplary embodiments may obviously be carried out for $n$-phase where $n$ is smaller or larger than 3. As in the control devices, according to the main patent, the phase position of the rectangular potential, and with it the degree of current passage of the converter, may be regulated automatically in dependence upon the consumption load.

The arrangement, on the one hand, is independent of the use of a direct current potential source which has, for example, a battery which requires continuous servicing (observation of the condition of discharge, repeated charging, etc.). On the other hand, that switching consumption which is necessary to produce direct current potential with the aid of network connections (rectifiers, direct current potential transformers) feeding the ohmic inverter or the contact apparatus, is eliminated. Finally the use of a rotating mechanical contact apparatus is principally avoided by the invention. This signifies the suppressing of a series of technical disadvantages. To the latter belong the inaccuracy of the control produced by the using up and the soiling of the contacts, and a relatively large control power, as well as the inertia of the rotating apparatus.

It is apparent that many modifications may be made in the form and number of the elements and their arrangement in the circuit illustrated. Accordingly, it is desired that only such limitations be imposed on the following claims as is necessitated by the prior art.

I claim as my invention:

1. A system for changing frequency comprising an input alternating current circuit of the frequency to be changed, a converter circuit and an output circuit of the desired changed frequency, said converter circuit comprising rectifier paths, a single control means in each of said rectifier paths and means impressing upon said control means a potential of the frequency of the current to be converted and a potential of the frequency of the current to be produced, said potential of the frequency of the current to be converted being applied to said control means in substantially rectangular wave form.

2. A system for changing frequency comprising an input alternating current circuit of the frequency to be changed, a converter circuit and an output circuit of the desired frequency, said converter circuit comprising rectifier paths, a single control element in each of said rectifier paths, means impressing upon said control element a potential of the frequency of the converted current, auxiliary discharge paths applying a potential of the frequency of the current to be changed to said control elements and impedance means associated with said auxiliary discharge paths forming the frequency wave of potential therefrom into a rectangular shape.

3. A frequency converting system comprising an input alternating-current circuit of the frequency to be changed, an alternating-current load circuit of the desired changed frequency, a transformer interconnecting said input circuit and said load circuit, a multi-path converter for controlling the flow of current between said circuits, a single control electrode for each path of said converter, control means for impressing a composite control potential on each of said control electrodes, said composite control potential including a potential of the frequency of the current to be converted and a potential of the frequency of the current to be produced.

4. A frequency converting system comprising an input alternating-current circuit of the frequency to be changed, an alternating-current load circuit of the desired changed frequency, a transformer interconnecting said input circuit and said load circuit, a multi-path converter for controlling the flow of current between said circuits, a single control electrode for each path of said converter, control means for impressing a composite control potential on each of said control electrodes, said means comprising a control transformer for producing a potential of the frequency of the current to be produced and auxiliary converter means for impressing a potential of substantially rectangular wave form and having the frequency of the supply current on the potential of said control transformer.

5. A frequency conversion system comprising a polyphase supply circuit, a single-phase load circuit operating at a changed frequency from the supply frequency, a single phase transformer interconnecting said circuits, said transformer including a plurality of primary windings, each of said primary windings having a mid-tap connected to a phase terminal of said supply circuit, an arc type converter having arc paths connected to the terminals of said primary windings, a single phase control transformer energized at the frequency of the load circuit, said single phase control transformer having a plurality of secondary windings corresponding in number to the primary windings of the interconnecting transformer and an auxiliary converter for impressing on the potentials of said control transformer a potential corresponding in frequency to the frequency of the supply circuit.

KLAUS FREUDENHAMMER.